United States Patent
Doi et al.

(10) Patent No.: US 6,771,161 B1
(45) Date of Patent: Aug. 3, 2004

(54) DATA TRANSMISSION SYSTEM USING A HUMAN BODY AS A SIGNAL TRANSMISSION PATH

(75) Inventors: Kenji Doi, Nara (JP); Mitsuhide Maeda, Suita (JP); Hitoshi Sakakibara, Suita (JP); Masaru Hashimoto, Neyagawa (JP); Keiichi Yoshida, Moriguchi (JP); Masaki Koyama, Osaka (JP); Osamu Nishimura, Kishiwada (JP); Yoshiko Suzuki, Moriguchi (JP)

(73) Assignee: Matsushita Electric Works, Ltd., Osaka (JP)

( * ) Notice: Subject to any disclaimer, the term of this patent is extended or adjusted under 35 U.S.C. 154(b) by 505 days.

(21) Appl. No.: 09/605,357

(22) Filed: Jun. 29, 2000

(51) Int. Cl.[7] .............................. H04B 1/00; H04Q 5/22
(52) U.S. Cl. ..................... 340/5.64; 340/5.1; 340/5.2; 340/10.34
(58) Field of Search .................. 340/825, 5.1, 5.2, 340/5.6, 5.64, 573.1, 10.34; 713/182

(56) References Cited

U.S. PATENT DOCUMENTS

| | | | |
|---|---|---|---|
| 4,591,854 A | | 5/1986 | Robinson |
| 4,688,036 A | * | 8/1987 | Hirano et al. ................ 235/422 |
| 5,621,412 A | * | 4/1997 | Sharpe et al. ............. 340/10.33 |
| 5,682,032 A | * | 10/1997 | Philipp ..................... 340/573.1 |
| 5,796,827 A | * | 8/1998 | Coppersmith et al. ...... 713/182 |
| 5,811,897 A | | 9/1998 | Spaude et al. |
| 5,914,701 A | * | 6/1999 | Gersheneld et al. .......... 341/33 |
| 6,011,320 A | * | 1/2000 | Miyamoto et al. ......... 307/10.2 |
| 6,034,617 A | * | 3/2000 | Luebke et al. ............. 340/5.62 |
| 6,211,799 B1 | * | 4/2001 | Post et al. ..................... 341/33 |
| 6,346,886 B1 | * | 2/2002 | De La Huerga ............ 345/156 |
| 6,580,356 B1 | * | 6/2003 | Alt et al. ..................... 340/5.7 |

FOREIGN PATENT DOCUMENTS

| | | |
|---|---|---|
| EP | 0843425 A2 | 5/1998 |
| JP | 61046639 | 3/1986 |
| JP | 10-229357 | 8/1998 |
| JP | 11-509380 | 8/1999 |

* cited by examiner

Primary Examiner—Brian Zimmerman
Assistant Examiner—Clara Yang
(74) Attorney, Agent, or Firm—Rader, Fishman & Grauer PLLC

(57) ABSTRACT

Touch-responsive data transmission system for elongating transceiver battery life and assuring one-touch data transmission includes a first transceiver worn on user and a second transceiver connected to equipment utilizing first transceiver data. User contacts first transceiver signal and ground electrodes and touches a second transceiver touch electrode to establish a signal path through user. First transceiver includes a detector for detecting a start signal from the second transceiver signal electrode. Second transceiver includes a generator for generating the start signal upon touching the touch electrode. Receiving the start signal, circuit elements responsible for data transmission are battery-energized to start data transmission from first to second transceivers. Circuit elements responsible for transmitting data remain deenergized until user touches the second transceiver touch electrode to save energy during non-operation and prolong first transceiver battery life. By touching the touch electrode, automatic data transmission remains possible without requiring additional starting procedures.

3 Claims, 8 Drawing Sheets

DATA TRANSMISSION SYSTEM USING A HUMAN BODY AS A SIGNAL TRANSMISSION PATH

BACKGROUND OF THE INVENTION

1. Field of the Invention

The present invention relates to a data transmission system using a human body as a signal path, and more particularly to a system composed of a first transceiver adapted in use to be worn on a human body and a second transceiver adapted to be connected to an associated equipment which utilize data transmitted from the first transceiver.

2. Description of the Prior Art

U.S. Pat. No. 4,591,854 discloses a data transmission system using the human body as a signal path. The system includes a portable transmitter in the form of a wrist watch to be worn on a user, and a control unit or signal receiver. The transmitter has a pair of electrodes on the back of the wrist watch for direct contact with the skin of the user. One electrode acts as a signal electrode which is connected through a portion of the user's body to a touch electrode of the signal receiver, while the other electrode acts as a ground electrode which is coupled through or not through the other portion of the user's body to a circuit ground of the signal receiver to complete a signal path through the user's body for data transmission from the wrist watch to the signal receiver. The signal receiver includes a touch sensor to detect touching state and non-touching state of the touch electrode so as to enable the signal receiver to receive the data from the wrist watch when the touching is detected for the purpose of avoiding accidental enabling of equipment connected to the signal receiver by radiated signals. To enable this automatic reception of the data at the signal receiver, the wrist watch has to be always ready for transmitting the data or has to include a manual start switch for starting transmission of data. When the wrist watch is designed to be constantly energized to be always ready for the data transmission, a battery energizing electronic components of the wrist watch is likely to be soon exhausted. When the wrist watch is designed to include the start switch, it adds a cumbersome manual operation, thereby detracting from the touch-responsive data transmission.

SUMMARY OF THE INVENTION

In view of the insufficiencies, the present invention has been achieved to provide a touch-responsive data transmission system which is capable of elongating the battery life of the transceiver worn on the user's body yet assuring one-touch data transmission. The system in accordance with the present invention comprises a first transceiver adapted in use to be worn on the user's body and a second transceiver adapted to be connected to an associated equipment which utilizes data transmitted from the first transceiver. The first transceiver comprises a battery energizing the circuit of the first transceiver, a ground electrode for direct contact with the user's body to establishing an electrical connection through the user's body to a ground, and a signal electrode spaced from the ground electrode for direct contact with the user's body. Also, the first transceiver includes a data memory storing first data to be transmitted, a first modulator which is energized selectively by the battery for converting the first data into a first modulated voltage signal, and a first signal transmitter which is energized selectively by the battery to apply the first modulated voltage signal across the signal electrode and the ground electrode. Further included in the first transceiver are a start signal detector which is constantly energized by the battery for detection of a start signal received through the signal electrode, and a first controller which is constantly energized by the battery and is connected to the start signal detector so as to energize the first modulator and the first transceiver for applying the first modulated signal in response to the start signal.

The second transceiver comprises a second circuit ground for connection with the ground, a single touch electrode for direct contact with a portion of the use's body wearing the first transceiver, a second signal detector connected across the touch electrode and the second circuit ground to detect the first modulated voltage signal, and a second demodulator for converting the first demodulated signal back into the first data. Also, the second transceiver includes a start signal generator which generates the start signal and provides it through the touch electrode, and a touch sensor which is connected to the touch electrode to give a touch signal when the touch electrode is touched by the user's body. Further included in the second transceiver is a second controller which energizes the start signal generator to provide the start signal upon receiving the touch signal, thereby enabling data transmission from the first transceiver to the second transceiver. Thus, the first signal transmitter and the first modulator of the first transceiver can be kept deenergized until the user touches the touch electrode of the second transceiver, thereby saving energy during non-operated condition and assuring a prolonged battery life of the first transceiver. Also, the transmission of the first data can be made automatically simply by touching the touch electrode and without requiring any additional starting procedure. This is particularly advantageous in a case where the first transceiver is realized in the form of a battery operated wrist watch for use in a keyless entry system for access to a vehicle, restricted equipment, and restricted area.

Preferably, the second transceiver further includes a second modulator for converting second data into a second modulated voltage signal which is applied between the touch electrode and the second circuit ground for bilateral data transmission between the first and second transceivers. To receive the second data from the second transceiver, the first transceiver includes a first demodulator for converting the second modulated signal, which is detected through the signal electrode, into the second data. Further, the first controller has a function of modifying the first data in accordance with the second data. This arrangement is advantageous when the present system is utilized in an automated gate which permits the entry of a person wearing the first transceiver at a certain charge or fare. Thus, each time the person passes through the gate, the fee determined by the second data is subtracted from a credit stored as the first data of the first transceiver for updating the first data by the second data.

It is preferred that that first signal transmitter includes a current regulator which keeps a current flowing between the signal electrode and the ground electrode substantially at a fixed level for the purpose of successfully making reliable data transmission irrespective of differing electrical resistance of differing portions of the skin in contact with the signal and ground electrodes.

At least one of the signal electrode, the ground electrode, and the touch electrode may be coated with an insulation layer for making capacitive coupling with the user's body, avoiding the occurrence of electrical double layer at the interface between the user's skin and the electrode which would cause electrical polarization, the source of undesired noise.

The second circuit ground may be connected to the ground through a ground line for reducing impedance between the second circuit ground and the ground to which the ground electrode is connected through the user's body.

Also, the second transceiver is preferred to have an electrically conductive chassis to which the second circuit ground is connected.

Further, the second circuit ground may be connected to an electrically conductive sheet which is adapted to be installed on a site such that the human body wearing the first transceiver stands on the conductive sheet. Thus, it is possible to reduce the impedance between the second circuit ground and the user's body for reliable data transmission from the first transceiver to the second transceiver through the user's body.

The first transceiver may additionally include a display for indication of the first data so that the user can check the data. The data memory of the first transceiver may be detachable to the first transceiver so that the data memory can be installed on a separate writer for rewriting the first data or can be replaced with another data memory.

The first transceiver is held on a disk with the signal electrode and the ground electrode being arranged on one face of the disk. Thus, the first transceiver can be readily incorporated into a wrist watch with the disk forming the back plate of the watch.

Alternately, the first transceiver may be held on a ring with the signal electrode and the ground electrode being arranged on an interior face of the ring. Thus, the first transceiver can be easy to be carried on the user as well.

The second transceiver may be configured such that the touch sensor and the second controller are constantly energized by a power source to be always read for operation, while the second signal detector and the second demodulator are selectively energized by the power source. The second controller is responsive to the touch signal to energize the second signal detector and the second demodulator. Thus, the second signal detector and the second demodulator are kept deenergized until the second controller receives the touch signal for saving the power while the second transceiver is non-operating condition of not receiving the first data from the first transceiver.

In addition, the second controller has a function of deenergizing the second signal detector and the second demodulator after deriving the first data. More preferably, the second controller is configured to provide a predetermined time period for receiving the first demodulated voltage signal and to deenergize the second signal detector and the second demodulator after the elapse of the predetermined time period.

These and still other objects and advantageous features of the present invention will become more apparent from the following description of the preferred embodiments when taken in conjunction with the attached drawings.

DETAILED DESCRIPTION OF THE EMBODIMENTS

Figure 1:
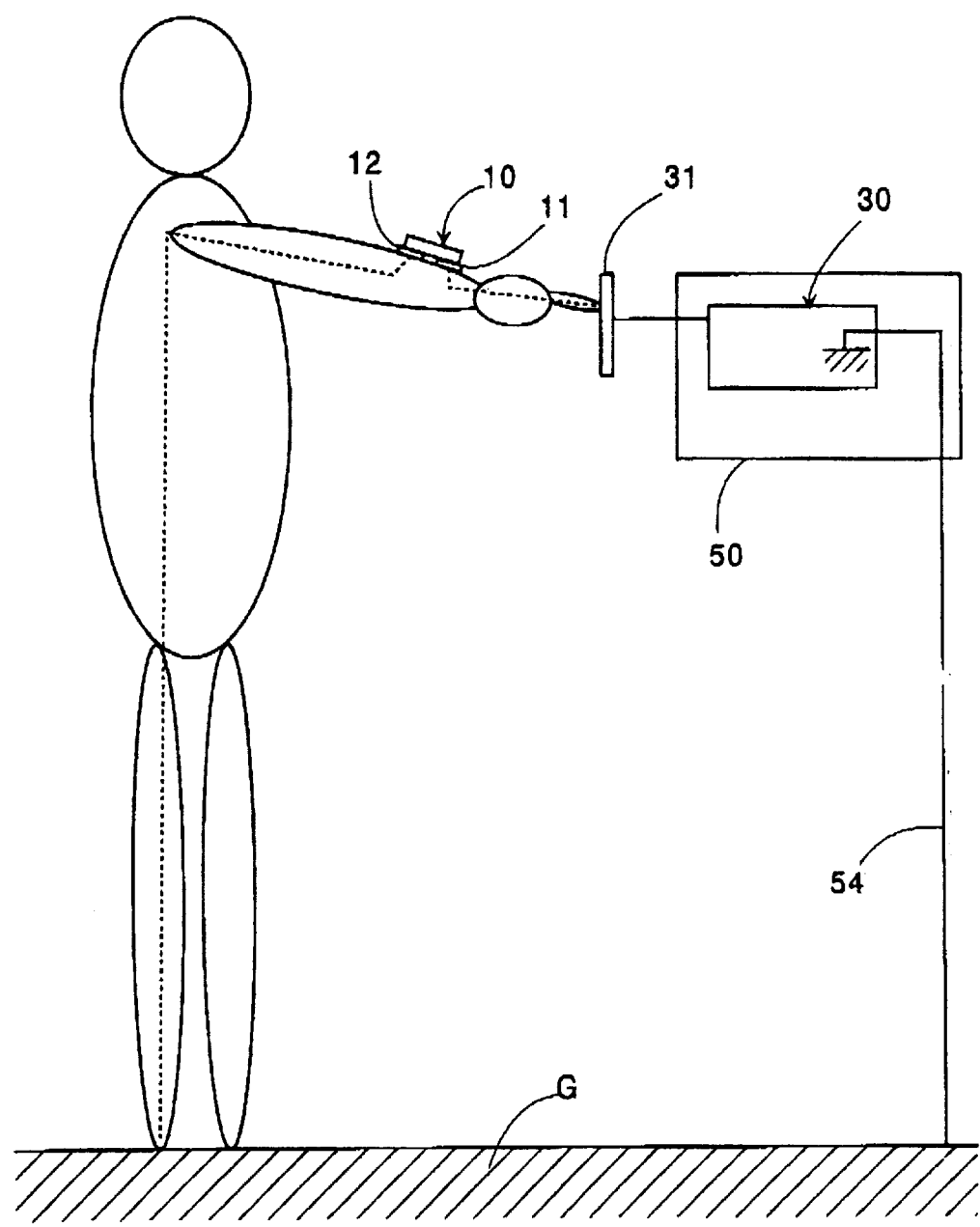
FIG. 1 is a schematic view illustrating a basic concept of a data transmission system in accordance with the present invention.

Referring first to FIG. 1, there is shown a principle of a data transmission system using a human body as a signal transmission path. The system includes a portable transceiver 10 (hereinafter referred to as a first transceiver) adapted to be worn on the human body, and an associated transceiver 30 (hereinafter referred to as a second transceiver) adapted to be installed on an equipment 50 which utilizes data transmitted from the first transceiver for controlled operation of the equipment. The first transceiver 10 has a signal electrode 11 and a ground electrode 12 which are held in contact with the user's body. When the user wearing the first transceiver 10 touches a touch electrode 31 of the second transceiver 30, a signal path is established which extends from the signal electrode 11 through a portion of the user's body, the touch electrode 31, an internal circuit of the second transceiver 30, a circuit ground of the second transceiver 30, a ground G, the other portion of the user's body, the ground electrode 12 and an internal circuit of the first transceiver 10. The signal path extending through the human body is indicated by dotted lines. Thus, a voltage signal applied across the electrodes 11 and 12 is transmitted to the second transceiver 30 when the user touches the touch electrode 31. In FIG. 1, the circuit ground of the second transceiver 30 is connected through a ground line 54 to the ground G for the sake of simplicity. However, the circuit ground may be capacitively connected to the ground G or even capacitively connected directly to the major portion of the user's body for establishing the signal path.

Figure 2:
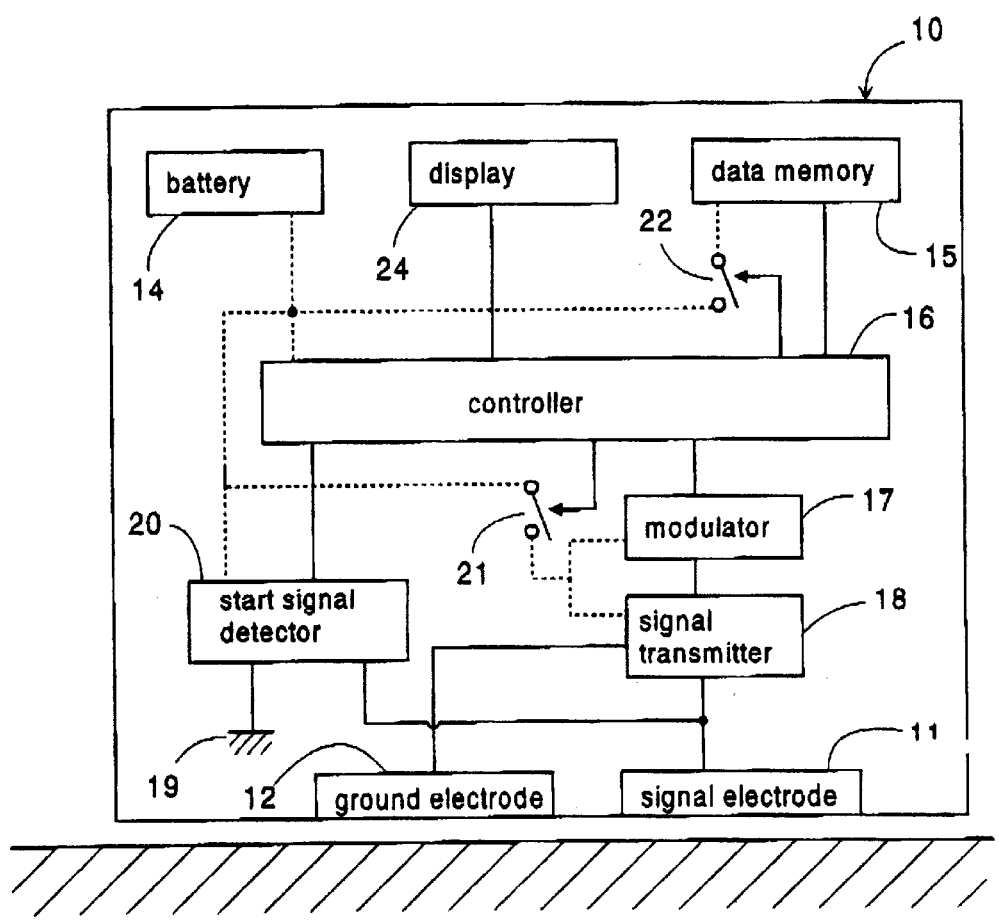
FIG. 2 is a block diagram of a portable transceiver of the above system adapted to be worn on the user's body.

As shown in FIG. 2, the first transceiver 10 includes a battery 14 and various circuits energized by the battery. The circuits includes a data memory 15 storing data to be transmitted, a controller 16, a modulator 17 modulating the data into a modulated voltage signal, a signal transmitter 18 applying the modulated voltage signal across the signal electrode 11 and the ground electrode 12 which are spaced each other by about 5 to 10 mm. Also included in the circuits is a start signal detector 20 which is connected to detect a start signal transmitted from the second transceiver 30 through the signal electrode 11. The start signal is received across the signal electrode 11 and a circuit ground 19. The circuit ground 19 may be connected to the ground electrode 12. Only the controller 16 and the start signal detector 20 are constantly energized by the battery 14 to be ready for detecting the start signal from the second transceiver 30. In the non-operative condition where the first transceiver 10 is not transmitting the data, the controller 16 is kept in a sleep mode of consuming less electric current from the battery 14. When the start signal is received as a consequence of the user touching the touch electrode 31, the start signal detector 20 wakes up the controller 16 which in turn energizes the data memory 15, the modulator 17, and the signal transmitter 18 by the battery 14 to apply the modulated voltage signal across the signal electrode 11 and the ground electrode 12 for initiating the data transmission. The controller 16 incorporates a timer which starts upon detection of the start signal to provide a predetermined time during which the data is transmitted. After the elapse of the predetermined time, the controller 16 responds to deenergize the modulator 17, the signal transmitter 18 and the data memory 15. For this purpose, the controller 16 includes power switches 21 and 22 which are actuated by the output of the start signal detector 20 and the timer to selectively energize and deenergize the modulator 17, the signal transmitter 18 and the data memory 15. Dotted lines in FIG. 2 show power supply lines from the battery. Any other means for determining the end of the data transmission may be utilized instead of the timer. Thus, after transmitting the data, the controller 16 goes back into the sleep mode of consuming less current or energy but being kept ready to detect of the start signal for another data transmission.

The signal transmitter 18 is designed to flow substantially constant current between the signal electrode 11 and the ground electrode 12 when applying the modulated voltage signal there across irrespective of varying electrical resistance between the electrodes through a portion of the human body, thereby assuring reliable data transmission to the second transceiver 30. Further, the first transceiver 10 optionally includes a display 24 for visual indication of the data stored in the data memory 15.

Figure 3:
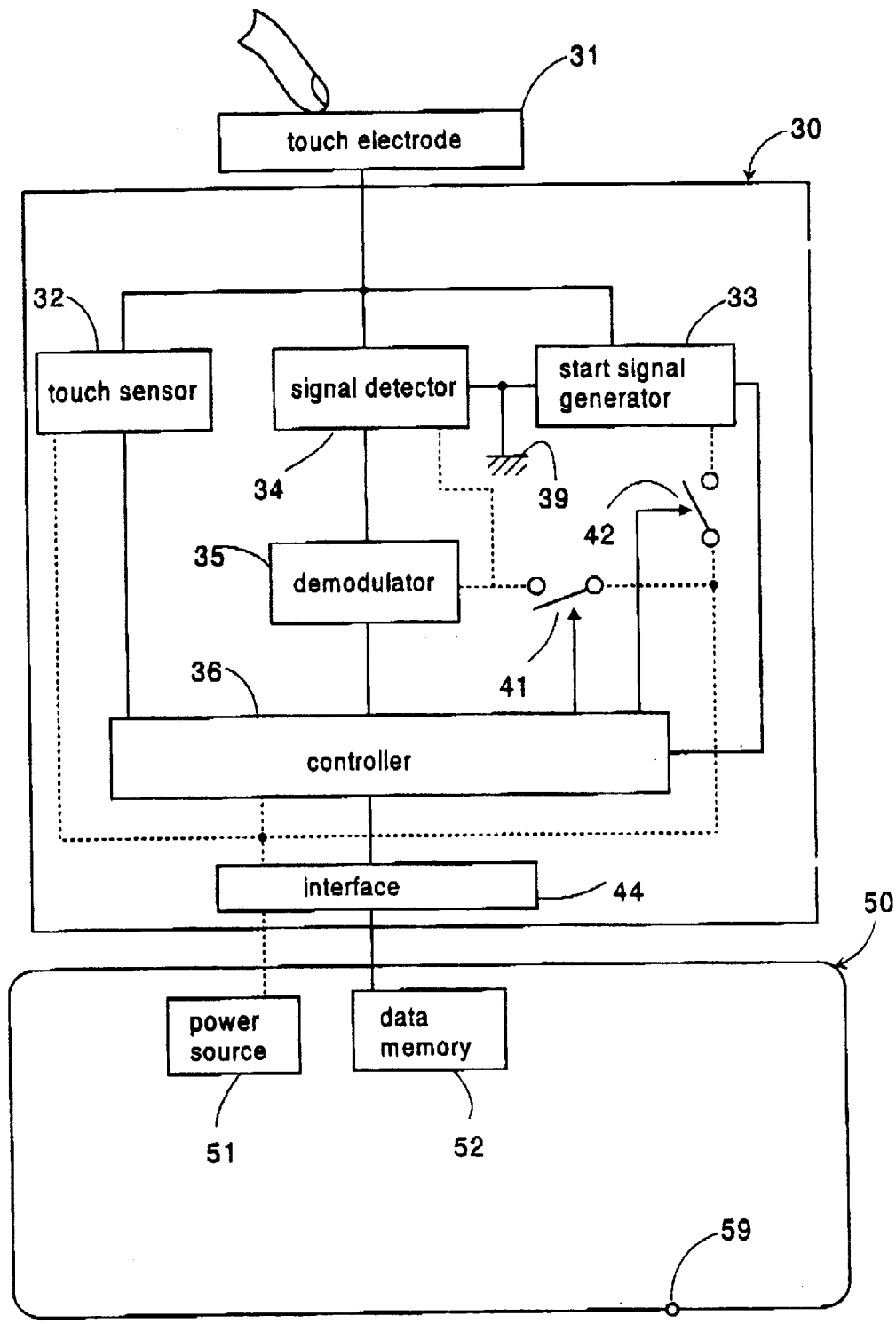
FIG. 3 is a block diagram of an associated transceiver of the above system adapted to be installed to an equipment utilizing the transmitted data.

As shown in FIG. 3, the second transceiver 30 includes various circuits connected to the touch electrode 31 disposed outside or on the exterior of a housing of the transceiver. The circuits are energized by a power source 51 provided in the equipment 50 to which the second transceiver 30 is attached. The circuits are commonly connected to a circuit ground 39 which is in turn connected to a ground terminal 59 of the equipment for connection with the ground G. The circuits includes a touch sensor 32 which is connected to the touch electrode 32 to give a touch signal when the touch electrode 31 is touched by the user's body. Also included in the circuits are a start signal generator 33, a signal detector 34, a demodulator 35, and a controller 36 which controls the operations of the circuits. The start signal generator 33 applies the start signal to the touch electrode 31 in response to the touch signal. The start signal generated is, for example, a uniform AC voltage signal. The signal detector 34 detects the modulated voltage signal which is transmitted from the first transceiver and received across the touch electrode 31 and the circuit ground 39. The modulated voltage signal thus detected is demodulated at the demodulator 35 to derive the first data which is then fed to the equipment to be processed thereat.

Under the non-operating condition where the touch electrode is not touched by the human body, only the controller 36 and the touch sensor 32 are energized to be ready for detection of the touching. Upon the touch electrode 31 being touched, the touch sensor 32 gives the touch signal to the controller 36 which responds to close switches 41 and 42 to energize the start signal generator 33, the signal detector 34, and the demodulator 35, thereby generating the start signal and making the circuits ready for receiving the data from the first transceiver. The controller 36 also includes a timer which starts, upon receiving the touch signal, to provide a predetermined time interval during which the data transmission from the first transceiver 10 is expected to complete. After the elapse of the predetermined time interval, the controller 36 responds to open the switches 41 and 42, deenergizing the start signal generator 33, the signal detector 34, and the demodulator 35. Thus, the second transceiver 30 is kept in a sleep mode of consuming less electricity until the touch electrode 31 is touched. Dotted lines in FIG. 3 show power supply lines. The second transceiver 30 further includes an interface 44 for transferring the data to the equipment as well as for receiving the power supply therefrom.

Figure 4:
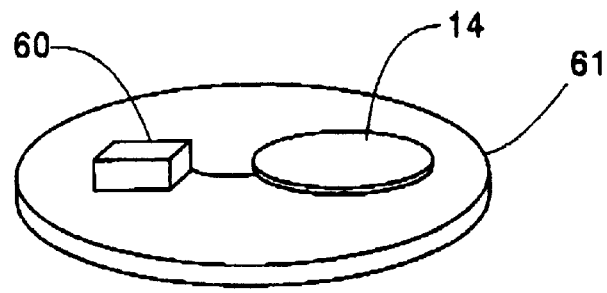
FIG. 4 is a perspective view of the portable transceiver.
Figure 5:
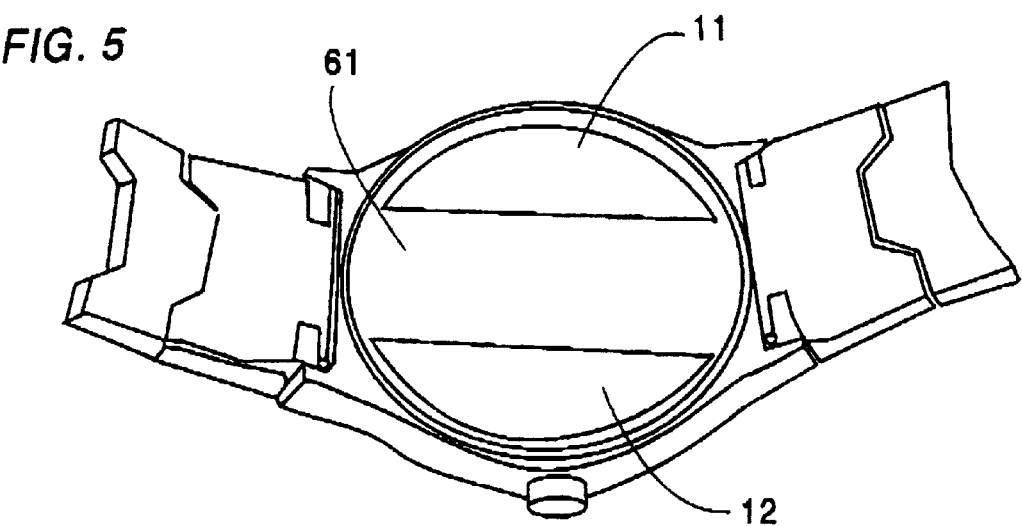
FIG. 5 is a perspective view of the portable transceiver incorporated in a wrist watch.
Figure 6:
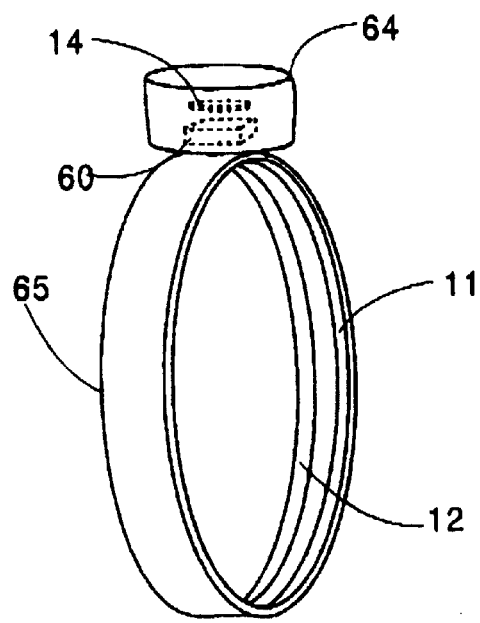
FIG. 6 is a perspective view of the portable transceiver realized in the form of a ring.

As shown in FIG. 4, the circuits of the first transceiver 10 are integrated into a single chip 60 which is mounted on a disk 61 together with the button-shaped battery 14. The signal electrode 11 and the ground electrode 12 are disposed on the back of the disk 61. The disk 61 is incorporated into a wrist watch as a back plate thereof, as shown in FIG. 5, so that the electrodes 11 and 12 can be always kept in contact with the arm of the user. Alternately, the chip 60 may be incorporated together with the button-shaped battery 14 in a gem-like shell 64 which is supported on top of a ring 65. The signal electrode 11 and the ground electrode 12 are disposed on the interior of the ring 4 to be always kept in contact with the finger of the user. Likewise, the circuit of the second transceiver 30 may be integrated into a single chip so as to be readily incorporated or attached to the equipment. At least one of the signal electrode 11, the ground electrode 12, and the touch electrode 31 may be covered with a dielectric material to establish a capacitive coupling to the corresponding portion of the user's body, avoiding the electrical double layers at the interface between the electrode and the user's body for reliable data transmission.

It is noted that the circuits of the first and second transceivers are shown according to their functions in FIGS. 2 and 3 for easy understanding of the operations of the transceivers. Therefore, the modulator 17 and the demodulator 35 may be realized by software schemes included in the respective controllers 16 and 36, rather than by hardware schemes.

The second transceiver may include a chassis of electrically conductive material to which the circuit ground is coupled. The chassis has a sufficient surface area for establishing a strong capacitive coupling to the ground G for effective data transmission through the human body between the first and second transceivers. Alternately, the circuit ground of the second transceiver may be directly connected to the ground G by means of a conductive wire or line. Further, in order to enhance the electrostatic coupling between the human body and the circuit ground of the second transceiver, it may be effective to use an electrically conductive sheet which is adapted to be installed on a site such that the human body wearing the first transceiver stands on the conductive sheet.

Figure 7:
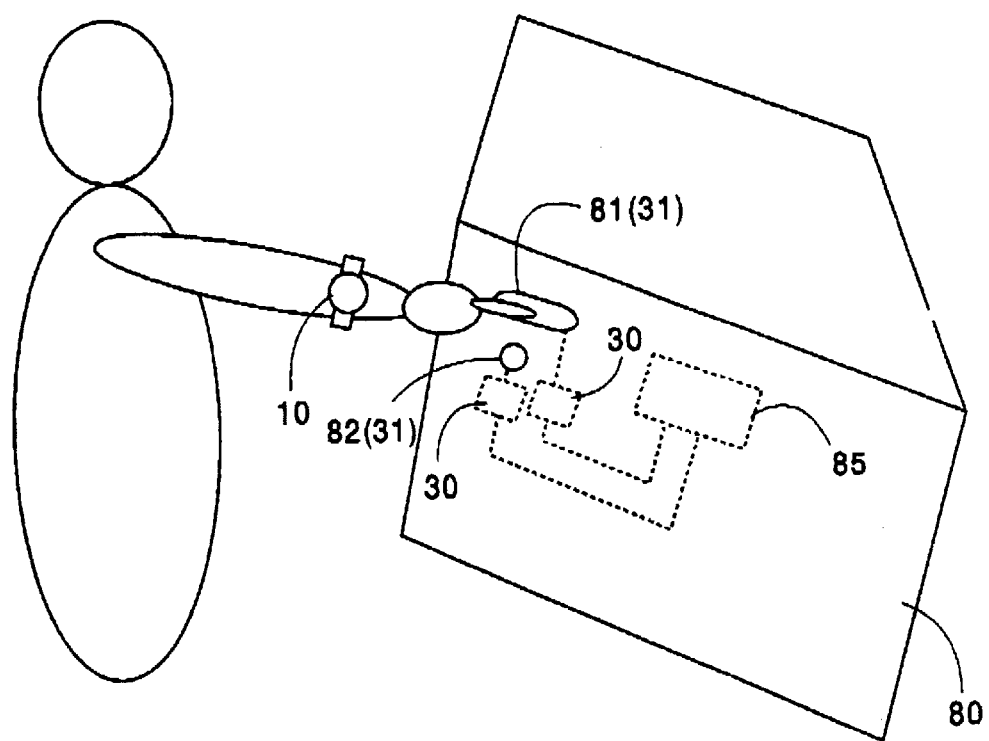
FIG. 7 is schematic view of the system utilized for a keyless entry system for a vehicle.

FIG. 7 shows one typical application of the present system for a keyless entry system of a vehicle. The first transceiver 10 in the form of the wrist watch is carried by the user, while the two second transceivers 30 are embedded in a door 80 of the vehicle to be connected commonly to a door lock mechanism 85. One transceiver 30 is utilized as a door opening sensor with the touch electrode 31 forming a door handle 81, while the other transceiver 30 is utilized as a door locking sensor with the touch electrode 31 forming a door lock 82. The circuit grounds of the two transceivers 30 are commonly connected to a body of the vehicle. When the user wearing the first transceiver 10 touches the door handle 81, the data stored in the data memory of the first transceiver 10 is transmitted to the second transceiver 30 in a manner as described hereinbefore. The data, which is an identification data for the vehicle, is compared with a reference data stored in the door lock mechanism. When the received data is judged to coincide with the reference data, the door lock mechanism 85 operates to unlock the door. When the user touches the door lock 82 on the other hand, the associated transceiver 30 gives the received data to the mechanism 85 which responds to identify the received data and operate to lock the door when the received data is coincide with the reference data. Alternately, the second transceiver may be specifically designed such that the controller 36 stores the reference data and has a function of comparing the received data with the reference data so as to give a unlock signal and a lock signal for actuating the mechanism 85 to unlock and lock the door.

Likewise, the present system can be also adapted to an ignition system for starting the vehicle's engine. For instance, the second transceiver can be embedded in a suitable area around a vehicle's dashboard with the touch electrode exposed at an easily accessible position. Thus, the user wearing the first transceiver can be easy to start the engine simply by touching the touch electrode.

Figure 8:
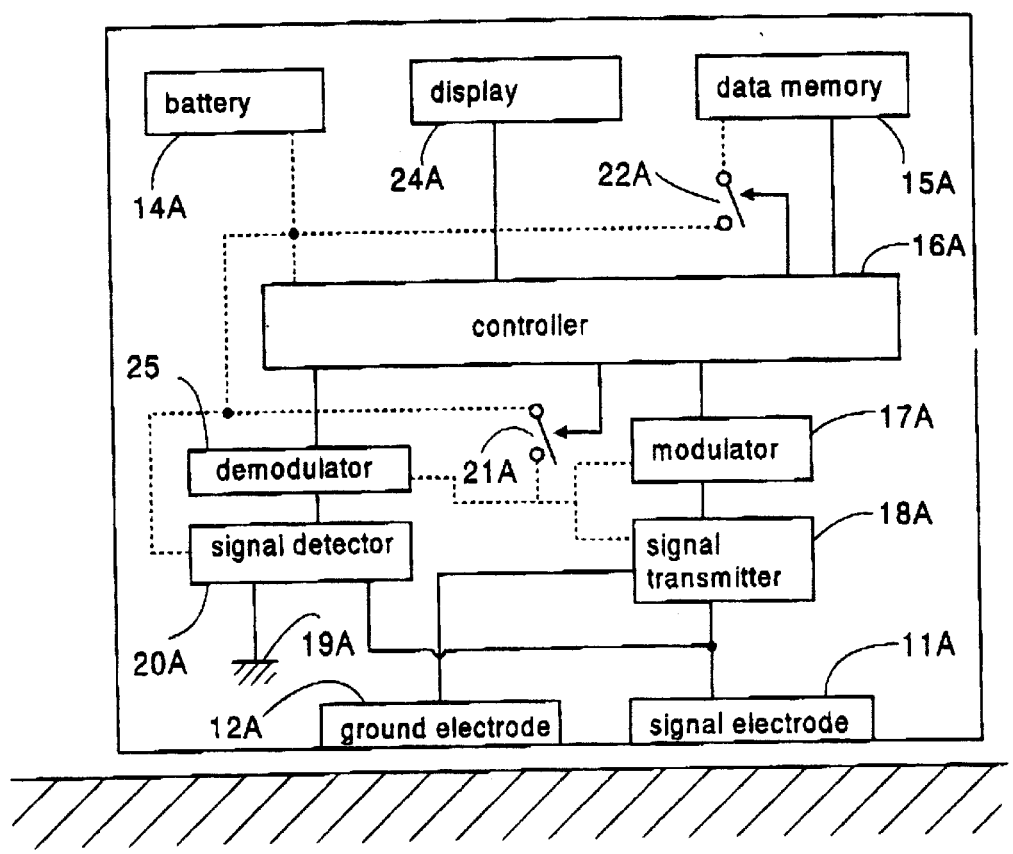
FIG. 8 is a block diagram of a portable transceiver utilized in a data transmission system in accordance with another embodiment of the present invention.
Figure 9:
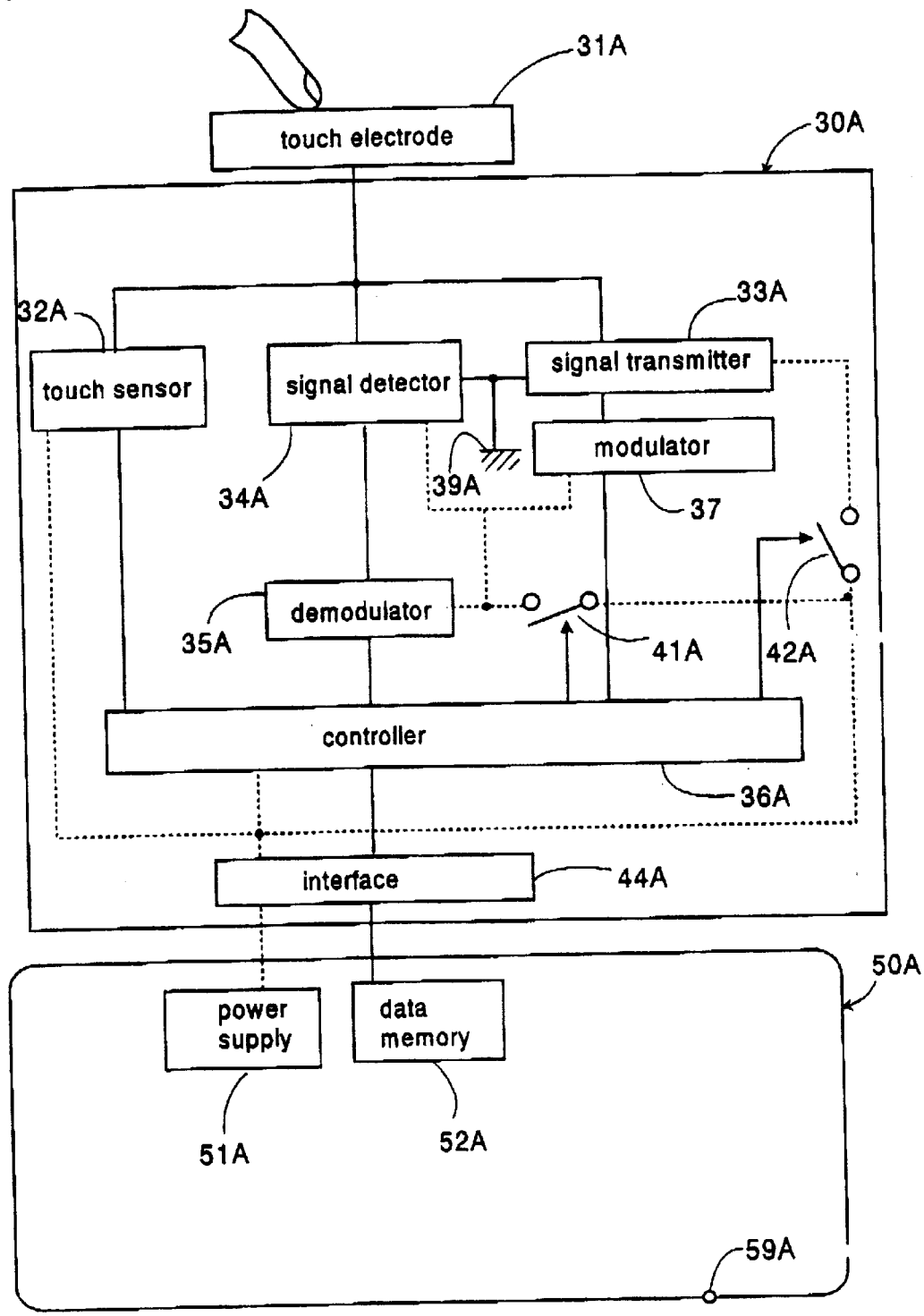
FIG. 9 is a block diagram of an associated transceiver of the above system.

Referring to FIGS. 8 and 9, there is shown a data transmission system in accordance with a second embodiment of the present invention which is designed to effect a bilateral data transmission between a first transceiver 10A and a second transceiver 30A. These transceivers are identical to those of the first embodiment except that the first transceiver 10A further includes a demodulator 25 for demodulating data transmitted from the second transceiver 30A and that the second transceiver 30A further includes a modulator 37 for modulating the data to be transmitted from the second transceiver 30A Like circuit components are designated by like reference numerals with a suffix letter of "A". The modulator 37 of the second transceiver 30A gives a modulated voltage signal indicative of the data to be transmitted to the first transceiver 10A. The signal transmitter 33A of the second transceiver 30A is responsible for applying the modulated voltage signal to the touch electrode 31A for data transmission to the first transceiver. The voltage signal also acts as the start signal for starting the data transmission from the first transceiver 10A to the second transceiver 30A. In this sense, the signal transmitter 33A serves as the start signal generator 33 of the first embodiment. In this connection, the signal detector 20A of the first transceiver 10A detects the modulated voltage signal transmitted from the second transceiver 30A and therefore serves as the start signal detector 20 of the first embodiment.

In operation, when the user wearing the first transceiver 10A touches the touch electrode 31A of the second transceiver, the touch sensor 32A provides a touch signal in response to which the controller 36A energizes the modulator 37, the signal transmitter 33A, the demodulator 35A, and the signal detector 34A. At first, the controller 36A retrieves the data from a data memory 52A of the equipment 50 and instructs to give and apply the modulated voltage signal indicative of the data. In response to the voltage signal from the second transceiver 30A, the controller 16A of the first transceiver 10A activates the data memory 15A and performs a suitable processing of the data from the data memory 15A in consideration of the data received from the second transceiver 30A. The controller 16A updates the data of the data memory 15A depending upon the result of the processing. Thereafter, the controller 16A activates the modulator 17A and the signal transmitter 18A so as to transmit the modulated voltage signal indicative of the updated data to the second transceiver 30A through the electrodes 11A and 12A. The modulated voltage signal received at the second transceiver 30A is converted into the data which is utilized by the controller 36A for a controlled operation of an equipment or passed to the equipment to be processed thereat for a specific operation of the equipment. In this manner, the two-way data transmission is made between the first and second transceivers in a half-duplex manner. Depending upon a specific application to which the system is applied, the system may be designed to have more than one data transmission cycles in which the one-way data transmission from either of the first and the second transceiver repeats twice or more. In such case, the data in the data memory 15A of the first transceiver 10A is modified or updated by the data transmitted from the second transceiver 30A.

Also in this embodiment, the first transceiver 10A as well as the second transceiver 30A are designed to be of less energy consumption type. That is, the first transceiver 10A is kept in the sleep mode of energizing only the controller 16A and the signal detector 20A until the modulated voltage signal is received from the second transceiver 30A, and comes back again in the sleep mode after the data transmission between the first and second transceivers are completed. In other words, the data memory 15A, the modulator 17A, the signal transmitter 18A, and the demodulator 25 are energized by closure of the switches 21A and 22A only for a predetermined time period starting from receiving the modulated voltage signal from the second transceiver 30A. It is within the predetermined time period that the data transmission between the first and second transceivers is completed. Likewise, the second transceiver 30A is kept in the sleep mode of energizing only the controller 36A and the touch sensor 32A until the touch electrode 31A is touched by the human body, and come back to the sleep mode after the data transmission between the first and second transceivers are completed. Thus, the signal transmitter 33A, the modulator 37, the signal detector 34A, and the demodulator 35A are energized by closure of switches 41A and 42A only for a predetermined time period starting from the touch electrode being touched. Within the predetermined period, the data transmission between the first and second transceivers is completed. Therefore, if a person not wearing the first transceiver touches the touch electrode of the second transceiver, the whole circuits of the first and the second transceivers are energized only for the limited time periods, respectively, for saving the energy.

Figure 10:
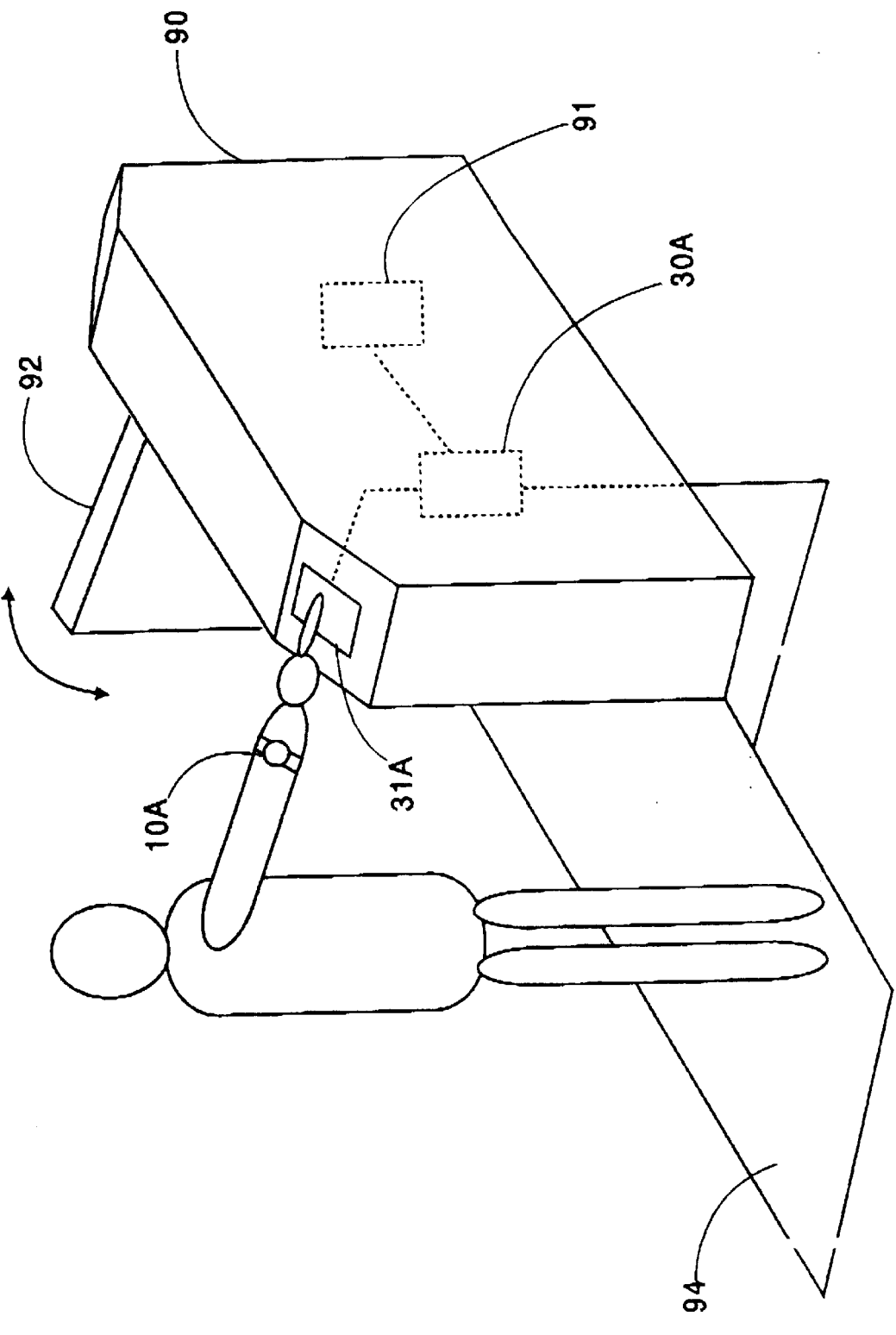
FIG. 10 is a schematic view of the system utilized in an automated gate system.

FIG. 10 shows a specific application of the data transmission system of the second embodiment to an automated gate installed on a railway station or the like which charges the person utilizing an associated facility. When the system is applied to the automated gate of the rail way station, the data in the first transceiver 10A includes information as contained a conventional ticket or pass. The second transceiver 30A is embedded in a gate 90 and is connected to a power source in the gate. The circuit ground of the second transceiver is connected to an electrically conductive sheet 94 on which the person stands for enhancing the capacitive coupling between the human body and the circuit ground. Alternately, the circuit ground may be simply connected to the ground. As soon as the person wearing the first transceiver 10A touches the touch electrode 31A exposed on top of the gate 90, the data transmission starts between the first and second transceivers and the data received at the second transceiver is processed to see whether the data indicates information which permits the person to pass through the gate. Such data processing is made in the controller of the second transceiver or a gate controller 91 equipped in the gate 90 to receive the data from the second transceiver. If the data shows that the person is permitted to pass through, the gate controller 91 is activated to open a door 92. In the like manner as in a conventional automated ticket gate, the data on either one of the first and second transceivers can be modified by the data in view of the data on the other transceiver. Thus, the present system enables a ticket-less gate system which is free from using the conventional ticket or pass and is therefore convenient for the user.

In this connection, the data of the first transceiver 10A can be renewed at an expense of corresponding fee with the use of the second transceiver 30A as a ticket machine. That is, the data of the first transceiver 10A can be written by data transfer from the second transceiver 30A. Alternately, the data memory of the first transceiver 10A can be made detachable so that the data can be renewed with the use of a separate data writer. The data in the data memory is indicated at the display for confirmation by the user.

Further, the present system can be well adapted for a cashless transaction though electronic money. In this application, the first transceiver 10A is adapted to store the electronic money in the data memory, while the second transceiver is installed at a register in a shop or POS (point of sale) terminal. When the user wearing the first transceiver touches the touch electrode of the POS terminal, for example, at the reception of a product or service, the data indicating the charge of the product or the service is transmitted to the data memory of the first transceiver. Subsequently, the data or the electronic money for settlement of the charge is transmitted from the first transceiver to the second transceiver to update the data processed at the POS terminal. At the same time, the electronic money in the first transceiver is subtracted by the charge to update the electronic money which is indicated at the display for confirmation by the user. The electronic money of the first transceiver can be written at a bank or financial institution by the data transmission from the second transceiver installed as a money generating device in exchange of a cash or deposited money. Further, the data memory may be detachable to the first transceiver so as to placed singly in a dedicated money generating device for rewriting the electronic money. The electronic money stored in the first transceiver can be checked at the display of the first transceiver.

Further, the present system can be well adapted for a pay phone system in which the second transceiver is installed in a pay phone with the touch electrode exposed on a handset. Thus, when the user wearing the first transceiver grasps the handset, the data transmission between the first and second transceiver can be made for payment of the telephone charges.

List of Reference Numerals

10 first transceiver
11 signal electrode
12 ground electrode
14 battery
15 data memory
16 controller
17 modulator
18 signal transmitter

What is claimed is:

1. A data transmission system using a human body as a signal transmission path, said system comprising a first transceiver adapted to be worn on a human body, and a second transceiver adapted to be connected to an associated device which utilizes data transmitted from said first transceiver,
said first transceiver comprising:
a battery;
a ground electrode for direct contact with the human body to establish an electrical connection through the human body to a ground;
a signal electrode spaced from said ground electrode for direct contact with the human body;
a data memory for storing first data to be transmitted;
a first modulator which is energized selectively by said battery for converting said first data into a first modulated voltage signal;
a first signal transmitter which is energized selectively by said battery to apply the first modulated voltage signal across said signal electrode and said ground electrode;
a start signal detector which is constantly energized by said battery for detecting a start signal received through said signal electrode; and
a first controller which is constantly energized by said battery and is connected to said start signal detector so as to energize said first modulator and said first signal transmitter for applying said first modulated voltage signal in response to said start signal, and
said second transceiver comprising:
a second circuit ground adapted to be connected to the ground;
a single touch electrode for direct contact with a portion of the human body wearing said first transceiver;
a second signal detector connected across said touch electrode and said second circuit around to detect said first modulated voltage signal;
a second demodulator for converting said first modulated voltage signal back into said first data;
a start signal generator for generating said start signal and providing it through said touch electrode;
a touch sensor which is connected to said touch electrode to give a touch signal when said touch electrode is touched by the human body;
a second controller which energizes said start signal generator to provide said start signal only in response to said touch signal, thereby enabling data transmission from said first transceiver to said second transceiver.
wherein
said second transceiver has a power source which energizes said touch sensor and said second controller constantly by said power source, while energizing said second signal detector and said second demodulator selectively by said power source, said second controller responsive to said touch signal to energize said second signal detector and said second demodulator.

2. The data transmission system as set forth in claim 1, wherein said second controller has a function of deenergizing said second signal detector and said second demodulator after deriving said first data.

3. The data transmission system as set forth in claim 1, wherein said second controller has a function of providing a predetermined time period for receiving said first demodulated voltage signal and deenergizing said second signal detector and said second demodulator after the elapse of said predetermined time period.

* * * * *